United States Patent
Lo et al.

(10) Patent No.: US 8,873,579 B1
(45) Date of Patent: Oct. 28, 2014

(54) MULTI-RATE MEDIA INDEPENDENT INTERFACE OVER A PHYSICAL CODING SUBLAYER

(75) Inventors: William Lo, Cupertino, CA (US); Brett A. McClellan, Laguna Hills, CA (US)

(73) Assignee: Marvell International Ltd., Hamilton (BM)

( * ) Notice: Subject to any disclaimer, the term of this patent is extended or adjusted under 35 U.S.C. 154(b) by 101 days.

(21) Appl. No.: 13/591,974

(22) Filed: Aug. 22, 2012

Related U.S. Application Data

(60) Provisional application No. 61/540,995, filed on Sep. 29, 2011, provisional application No. 61/544,125, filed on Oct. 6, 2011.

(51) Int. Cl.
*H04W 4/00* (2009.01)
*H04L 12/28* (2006.01)
*H04J 3/18* (2006.01)

(52) U.S. Cl.
CPC .. *H04L 12/28* (2013.01); *H04J 3/18* (2013.01)
USPC ........... 370/465; 370/466; 370/647; 370/338; 709/233

(58) Field of Classification Search
CPC .. H04J 3/16–3/18; H04L 12/28; H04L 12/56; H04W 4/00
USPC ................ 370/257–258, 391, 465–469, 539, 370/338–339; 709/231–233, 246
See application file for complete search history.

(56) References Cited

U.S. PATENT DOCUMENTS

| | | | |
|---|---|---|---|
| 7,343,425 B1 * | 3/2008 | Lo et al. .................. | 709/246 |
| 7,356,047 B1 | 4/2008 | Mahalawat et al. | |
| 7,593,416 B1 | 9/2009 | Lo | |
| 7,668,430 B2 * | 2/2010 | McClellan et al. .......... | 385/134 |
| 7,693,226 B1 | 4/2010 | Lo | |
| 7,720,068 B2 * | 5/2010 | McClellan .................. | 370/391 |
| 7,760,750 B1 | 7/2010 | Lo | |
| 7,792,104 B2 * | 9/2010 | Tzeng .......................... | 370/389 |
| 7,809,021 B2 | 10/2010 | McClellan | |

(Continued)

OTHER PUBLICATIONS

IEEE Draft P802.3ae/D5.0 Supplement to Carrier Sense Multiple Access with Collision Detection (CSMA/CD) Access Method & Physical Layer Specifications—Media Access Control (MAC) Parameters, Physical Layer, and Management Parameters for 10 Gb/s Operation *The Institute of Electrical and Electronics Engineers, Inc.*, May 1, 2002.

(Continued)

*Primary Examiner* — Charles C Jiang
*Assistant Examiner* — Mohamed Kamara

(57) ABSTRACT

A method for inserting ordered sets into a data stream converted from a first rate to a second rate $N_A$ times greater than the first rate, while conforming to a requirement that symbols be arranged in units of symbol length M, includes receiving, at the first rate, a data packet containing data symbols, receiving $Y_1$ symbols of control information, and identifying an ordered set based on the $Y_1$ symbols. The method also includes generating $N_A$ repetitions of each data symbol of the data packet, determining whether $Y_1 * N_A / M$ has a non-zero remainder, and, at least partially in response to determining that $Y_1 * N_A / M$ has a non-zero remainder, generating a number of repetitions of the ordered set containing either more or fewer than $Y_1 * N_A$ symbols. The method also includes outputting, at the second rate, the data symbol repetitions and first ordered set repetitions.

24 Claims, 10 Drawing Sheets

(56) References Cited

U.S. PATENT DOCUMENTS

| | | |
|---|---|---|
| 7,979,587 B1 | 7/2011 | Lo |
| 8,018,962 B1 | 9/2011 | Sutardja et al. |
| 8,028,095 B1 * | 9/2011 | Lo et al. ........................ 709/246 |
| 8,144,635 B1 | 3/2012 | Lo |
| 8,165,176 B1 | 4/2012 | Lo et al. |
| 8,233,507 B1 | 7/2012 | Lo |
| 8,243,752 B2 | 8/2012 | Barkan et al. |
| 8,320,400 B1 | 11/2012 | Lo |
| 8,565,261 B1 * | 10/2013 | Lo ................................ 370/465 |
| 2010/0111100 A1 | 5/2010 | Baumer |

OTHER PUBLICATIONS

Office Action in U.S. Appl. No. 13/591,954 dated Feb. 7, 2014.

* cited by examiner

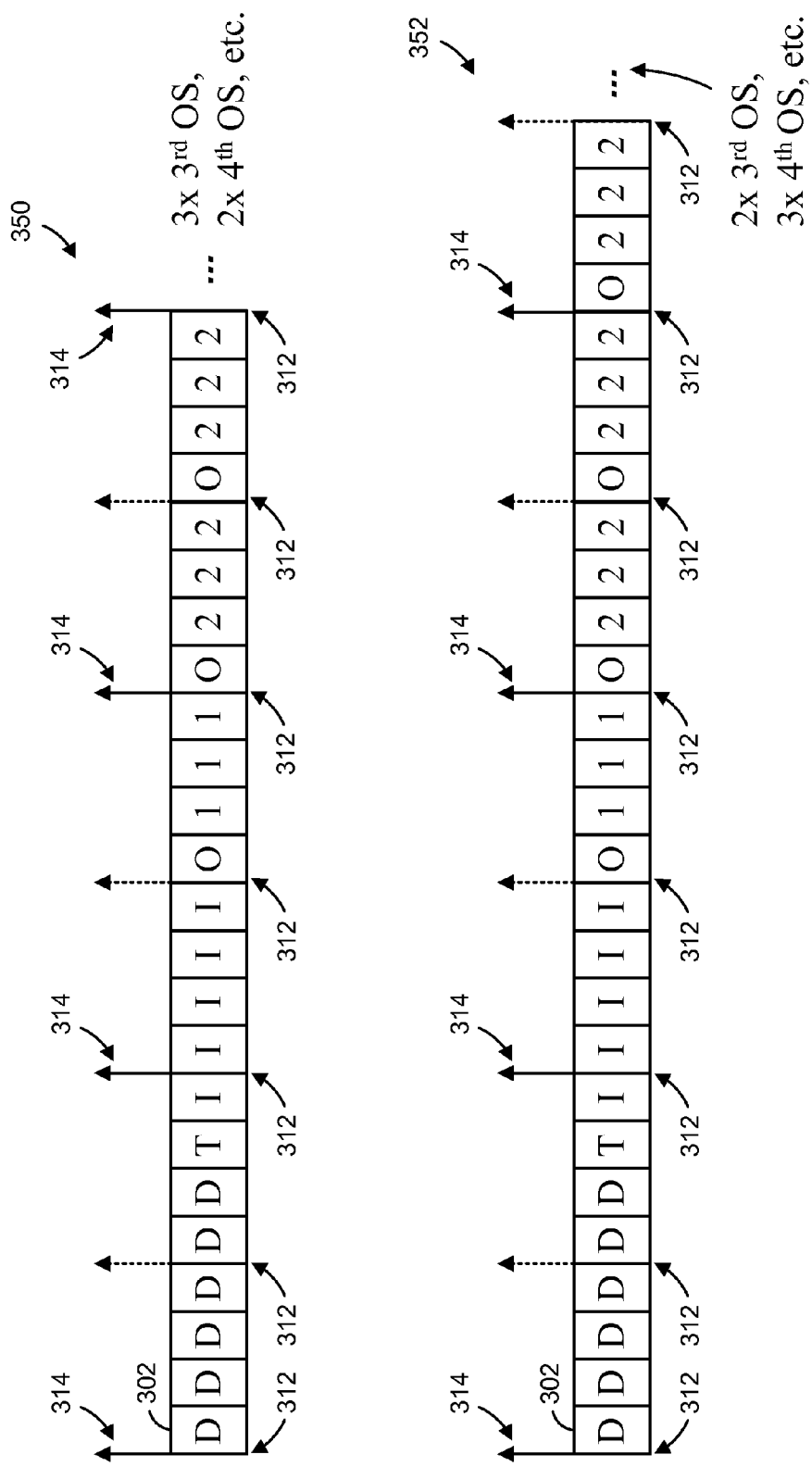

MULTI-RATE MEDIA INDEPENDENT INTERFACE OVER A PHYSICAL CODING SUBLAYER

CROSS-REFERENCE TO RELATED APPLICATION

This disclosure claims the benefit of U.S. Provisional Patent Application No. 61/540,995, entitled "Multi-Rate Media Independent Interface Over 10GBASE-R" and filed on Sep. 29, 2011, and U.S. Provisional Patent Application No. 61/544,125, entitled "Multi-Rate Media Independent Interface Over 10GBASE-R" and filed on Oct. 6, 2011, the disclosures of which are hereby incorporated by reference herein in their entireties.

The present application is related to U.S. patent application Ser. No. 13/591,954, entitled "Multi-Rate Media Independent Interface Over a Physical Coding Sublayer," filed on the same day as the present application, and which is hereby incorporated by reference herein in its entirety.

FIELD OF TECHNOLOGY

The present disclosure relates generally to communication systems and, more particularly, to multi-rate interfaces for communication systems.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

10 Gigabit Ethernet, a popular and growing technology, is standardized in the IEEE 802.3ae Standard. For example, the IEEE 802.3ae Standard specifies a 10 Gigabit Media Independent Interface (XGMII) between a media access controller (MAC) and a physical layer device (PHY). XGMII provides a full duplex channel operating at 10 gigabits per second (Gbps). For each direction, XGMII includes 36 parallel signals: a 32-bit data path, and four control signals (one control signal per eight bits of data). A total signal width of XGMII (including two clock signals) is 74 signals. Because of the width of XGMII, chip-to-chip, board-to-board, and other interfacing using XGMII is impractical (e.g., due to large pin counts, etc.). A physical coding sublayer (PCS) can be used with a serializer/deserializer (SERDES) to reduce the signal width to a more manageable number while maintaining data rate. For example, a 10GBASE-R PCS, which is compliant with Clause 49 of the IEEE 802.3ae Standard, can be used with a one-lane SERDES to reduce the signal width to only one signal (e.g., one differential signal) in each direction. However, the 10GBASE-R PCS is associated with various limitations restricting how XGMII signals can be encoded. Moreover, XGMII itself is associated with various coding limitations.

SUMMARY

In an embodiment, a method for inserting one or more ordered sets into a data stream converted from a first rate to a second rate $N_A$ times greater than the first rate, such that the converted data stream conforms to a set of coding requirements, and wherein the set of coding requirements includes a first requirement requiring that information symbols be arranged in units of a symbol length M, includes receiving, at the first rate, a data packet containing one or more data symbols, receiving $Y_1$ symbols of control information, and identifying a first ordered set based on the received $Y_1$ symbols of control information. The first ordered set contains O control symbols, and $N_A$ is not an integer multiple of O. The method also includes generating $N_A$ repetitions of each data symbol of the data packet, determining whether $Y_1*N_A$ has a non-zero remainder when divided by M, and at least partially in response to determining that $Y_1*N_A$ has a non-zero remainder when divided by M, generating a first number of repetitions of the first ordered set. The first number of repetitions of the first ordered set contains either more than or fewer than $Y_1*N_A$ control symbols. The method also includes outputting, at the second rate, (i) a converted data packet containing the $N_A$ repetitions of each data symbol of the data packet and (ii) the first number of repetitions of the first ordered set.

In another embodiment, an interface for converting data streams from a first rate to a second rate $N_A$ times greater than the first rate, such that the converted data streams conforms to a set of coding requirements, and wherein the set of coding requirements includes a first requirement requiring that information symbols be arranged in units of a symbol length M, includes a converter configured to receive, at the first rate, a data packet containing one or more data symbols, receive $Y_1$ symbols of control information, and identify a first ordered set based on the received $Y_1$ symbols of control information. The first ordered set contains O control symbols, and $N_A$ is not an integer multiple of O. The converter is also configured to generate $N_A$ repetitions of each data symbol of the data packet, determine whether $Y_1*N_A$ has a non-zero remainder when divided by M, and, at least partially in response to determining that $Y_1*N_A$ has a non-zero remainder when divided by M, generate a first number of repetitions of the first ordered set. The first number of repetitions of the first ordered set contains either more than or fewer than $Y_1*N_A$ control symbols. The converter is also configured to output, at the second rate, (i) a converted data packet containing the $N_A$ repetitions of each data symbol of the data packet and (ii) the first number of repetitions of the first ordered set.

BRIEF DESCRIPTION OF THE DRAWINGS

FIGS. 5A-5D are diagrams of various example XGMII data streams, converted from respective GMII data streams, that each include a series of consecutive ordered sets after a data packet, according to an embodiment and various scenarios.

DETAILED DESCRIPTION

Figure 1:
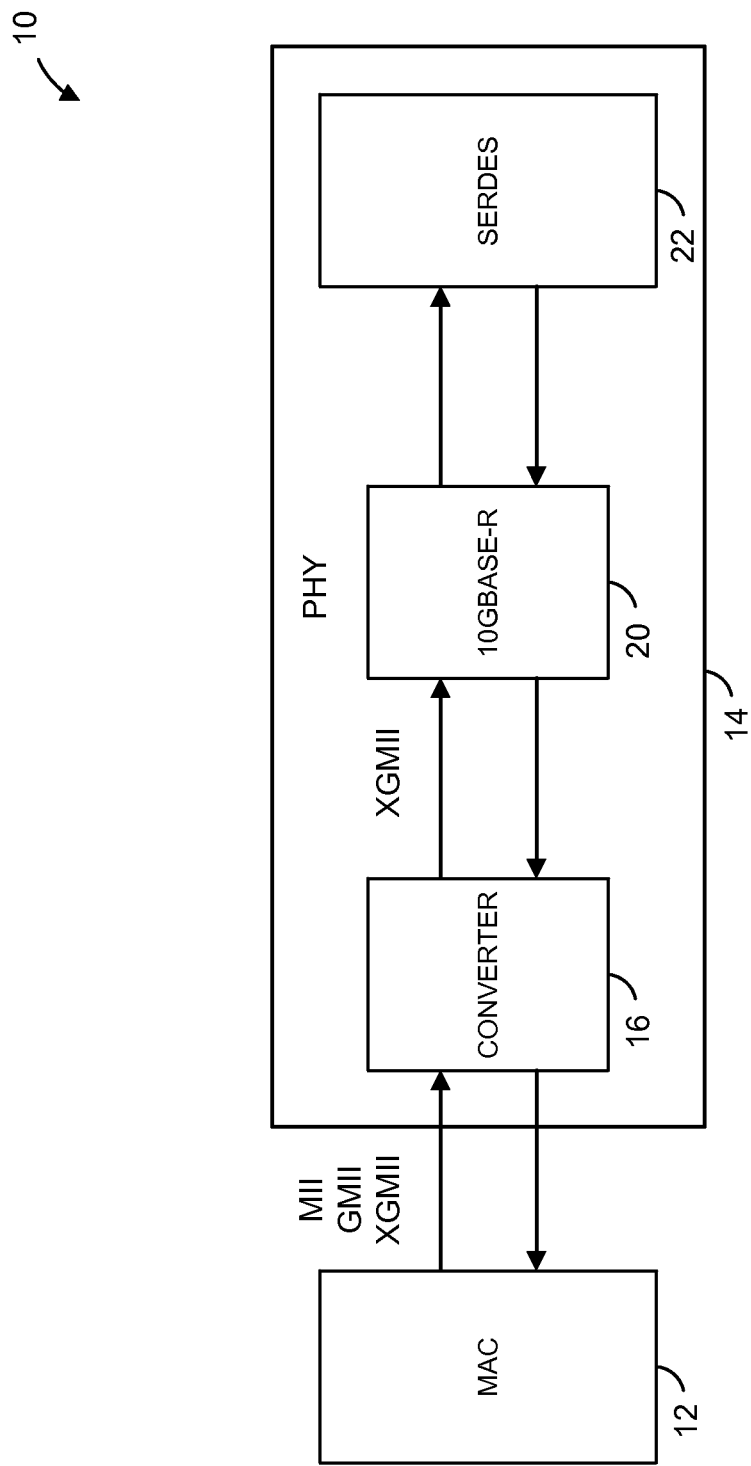
FIG. 1 is a block diagram of an example Ethernet system for providing a multi-rate interface between a MAC and a PHY, utilizing processing techniques of the present disclosure, according to an embodiment.

In various embodiments, a media access controller (MAC) is capable of communicating with a physical layer device (PHY) at different data rates specified by different interfaces. For example, a MAC and a PHY communicate at 10 megabits per second (Mbps) or 100 Mbps using a Media Independent Interface (MII), at 1 gigabit per second (Gbps) using a 1 Gigabit Media Independent Interface (GMII), or at 10 Gbps using a 10 Gigabit Media Independent Interface (XGMII), in an embodiment. In some embodiments, however, portions of the PHY can only operate at a single data rate. For example, in some embodiments, the PHY includes a physical coding sublayer (PCS), such as a 10GBASE-R PCS, that only operates at 10 Gbps using XGMII. In some of these embodiments, the PHY includes a converter that converts 10 Mbps or 100 Mbps MII data streams, and/or 1 Gbps GMII data streams, that are received from the MAC to 10 Gbps XGMII data streams. Once converted to the higher data rate, the data streams are then provided to a portion of the PHY that only operates at the higher data rate (e.g., to a 10GBASE-R PCS), in an embodiment. In some embodiments and scenarios, XGMII data streams are received from the MAC at 10 Gbps and simply "passed through" the converter, because no rate conversion is needed. In other embodiments and/or scenarios, however, 10 Mbps (MII), 100 Mbps (MII), or 1 Gbps (GMII) data streams are received from the MAC, and are converted to a 10 Gbps (XGMII) data stream by replicating data bytes, on average, 1000 times, 100 times, or 10 times, respectively.

In certain scenarios, coding requirements/limitations within a PHY (e.g., coding limitations of a PCS within the PHY), and/or coding restrictions inherent to the higher data rate interface (e.g., XGMII), may prevent straightforward N-times replication of bytes within the data stream for one or more of the desired conversion ratios. One source of difficulty arises from the fact that each of MII, GMII, and XGMII passes data at a different rate (i.e., a different number of bits per clock cycle). In particular, MII passes data at a rate of one "nibble" (two bits) per clock cycle, GMII passes data at a rate of one byte (eight bits) per clock cycle, and XGMII passes data at a rate of one "word" (32 bits, i.e., four bytes) per clock cycle. In an embodiment, a converter of a PHY replicates an MII or GMII data stream on a byte-by-byte basis. Thus, a single MII byte (two nibbles) is replicated to 250 words (i.e., 1000 byte repetitions/4 bytes per word) when converting 10 Mbps MII data to 10 Gbps XGMII data, a single MII byte is replicated to 25 words (i.e., 100 byte repetitions/4 bytes per word) when converting 100 Mbps MII data to 10 Gbps XGMII data, and a single GMII byte is replicated to 2.5 words (10 byte repetitions/4 bytes per word) when converting 1 Gbps GMII data to 10 Gbps XGMII data. The non-integer word total resulting from the conversion from GMII to XGMII can in some scenarios create problems, e.g., due to the IEEE 802.3ae Standard requirement that each XGMII data packet start at the beginning of a word. Moreover, in some embodiments, converted XGMII data streams are passed to a PCS, which may introduce additional constraints on a format of the XGMII data. For example, a 10GBASE-R PCS (which forms received data into "blocks" of two XGMII words each) cannot encode certain byte sequences that include ordered sets, as described in further detail below. Thus, in embodiments described below, a converter within a PHY converts data to a higher rate while satisfying certain encoding constraints, such as coding requirements of a media-independent interface (e.g., XGMII) and/or coding requirements of a PCS (e.g., 10GBASE-R).

FIG. 1 is a block diagram of an example Ethernet system 10 for providing a multi-rate interface between a MAC 12 and a PHY 14 utilizing processing techniques of the present disclosure, according to an embodiment. In various embodiments, each of MAC 12 and PHY 14 is a network device, a chip within a network device, or a different module or component (or a set of devices, chips, modules, and/or components). In an embodiment, PHY 14 includes, or is a part of, a copper PHY. In other embodiments, PHY 14 includes, or is a part of, a different type of PHY, such as an optical PHY, for example. In an embodiment, MAC 12 is configured to communicate with PHY 14 in accordance with any one of a plurality of media-independent interfaces, at a data rate corresponding to the respective interface. In the example system 10 of FIG. 1, for example, MAC 12 is configured to communicate with PHY 14 according to MII (at 10 or 100 Mbps), GMII (at 1 Gbps), or XGMII (at 10 Gbps). In an embodiment, the data rate selected for communications between MAC 12 and PHY 14 is determined as a result of an autonegotiation process (e.g., an autonegotiation process conducted between PHY 14 and another PHY not shown in FIG. 1).

PHY 14 includes a converter 16, a 10GBASE-R PCS 20, and a serializer/deserializer (SERDES) 22. The converter 16 passes XGMII data streams from MAC 12 through to the PCS 20 without changing the data rate, or converts lower-rate MII or GMII data streams from MAC 12 to higher-rate XGMII data streams compatible with the PCS 20, in an embodiment, depending on which data rate/interface is currently being utilized between MAC 12 and PHY 14. In the reverse direction, the converter 16 either passes XGMII data streams from the PCS 20 through to MAC 12 (when MAC 12 is operating at 10 Gbps), or converts XGMII data streams from the PCS 20 to lower-rate MII or GMII data streams (when MAC 12 is operating at 10 Mbps, 100 Mbps, or 1 Gbps), in an embodiment.

In some embodiments, the PCS 20 and SERDES 22 reduce a signal width of XGMII data received from MAC 12 via converter 16 (e.g., to reduce pin counts). While FIG. 1 shows an example system 10 in which MAC 12 communicates with PHY 14 using MII, GMII, or XGMII, and in which the PCS 20 communicates using XGMII, other embodiments utilize other sets of interfaces and data rates, and/or a different PCS. In one alternative embodiment, for example, MAC 12 communicates with PHY 14 at 10 Mbps, 100 Mbps, or 1 Gbps according to the serial gigabit media independent interface (SGMII), and the PCS 20 is a 1000BASE-X PCS rather than a 10GBASE-R PCS.

In some embodiments, the converter 16 inserts ordered sets into XGMII data streams that are provided to the PCS 20. Generally, ordered sets are used to convey control information not included in the packet data. For example, an ordered set can be used to indicate information such as a collision, carrier extension, or carrier extension with error, in an embodiment. As another example, an ordered set can be used to convey data rate information (e.g., during an autonegotiation process). In some embodiments and/or scenarios, the converter 16 identifies ordered sets based on control information received from MAC 12, and inserts the identified ordered sets into the XGMII data stream provided to the PCS 20. Various examples of embodiments in which ordered sets are inserted into an XGMII data stream are described in U.S. Pat. No. 7,720,068, entitled "Method and System for a Multi-Rate Gigabit Media Independent Interface," the disclosure of which is hereby incorporated by reference herein in its entirety.

In various embodiments, the converter 16 also processes data streams sent from MAC 12 to PHY 14 such that the data streams conform to the coding requirements of XGMII, and/or such that the data streams conform to the coding requirements of the PCS 20. Examples of coding requirements associated with XGMII and 10GBASE-R are described below using a nomenclature wherein the format "/x/x/x/x" represents a "word" of four bytes x, "/S" represents a start-of-packet byte, "/T" represents an end-of-packet byte, "/D" represents a data byte, "/I" represents an idle byte, and "/O/D/D/D" represents an ordered set. A two-word "block" formed by 10GBASE-R is represented as /x/x/x/x /x/x/x/x (e.g., /O/D/D/D /S/D/D/D for an ordered set immediately followed by the beginning of a data packet).

As one example of a coding requirement, XGMII requires that data be passed in one-word (i.e., four-byte) units. As another example, XGMII requires that each start-of-packet byte /S be located in the first byte position of a word. For example, /S/D/D/D is a permitted sequence, but /I/I/S/D is not a permitted sequence. Moreover, XGMII does not permit an ordered set to immediately follow the end of a packet (i.e., without any intervening idle bytes). Further, 10GBASE-R is unable to encode certain sequences that include an ordered set within a two-word block. For example, 10GBASE-R is unable to encode /T/I/I/I /O/D/D/D (i.e., a word of idle bytes following the last data byte of a packet, immediately followed by an ordered set), and is unable to encode /D/D/T/I /O/D/D/D (i.e., a first word containing the last two bytes of a data packet and two idle bytes, immediately followed by an ordered set). Coding requirements such as these can cause systems to "crash" or "choke" for certain sequences of data bytes, idle bytes, and/or ordered sets if a converter only uses simple, N-times repetition of all information bytes in a data stream. In some embodiments, however, these problematic sequences only occur at particular data rate conversion ratios. For example, in one embodiment subject to the coding restrictions described above, 10 Mbps or 100 Mbps MII data streams can be converted to 10 Gbps XGMII data streams using pure 1000× or 100× repetition for all data bytes and idle bytes, because each converted data or idle byte occupies 250 or 25 XGMII words, respectively, and, as a result, none of the impermissible byte sequences (e.g., /I/I/S/D, or /T/I/I/I /O/D/D/D, etc.) can occur. In this same embodiment, however, some 1 Gbps GMII data streams cannot be converted to 10 Gbps XGMII data streams using only 10× repetition. With 10× repetition, each GMII data or idle byte is converted to 10 XGMII data or idle bytes, which is equivalent to 2.5 XGMII words. Thus, Xtotal (data plus idle) bytes in the GMII data stream are converted to 2.5*X XGMII words, which results in a fractional word total whenever X is an odd number. The fractional word that results when converting an odd number of GMII bytes to XGMII can create a problem when passing ordered sets or idle bytes (e.g., due to the prohibition on sequences such as /I/I/S/D). Solutions to these problems are described below with reference to FIGS. 2-6, according to various embodiments.

Figure 2:
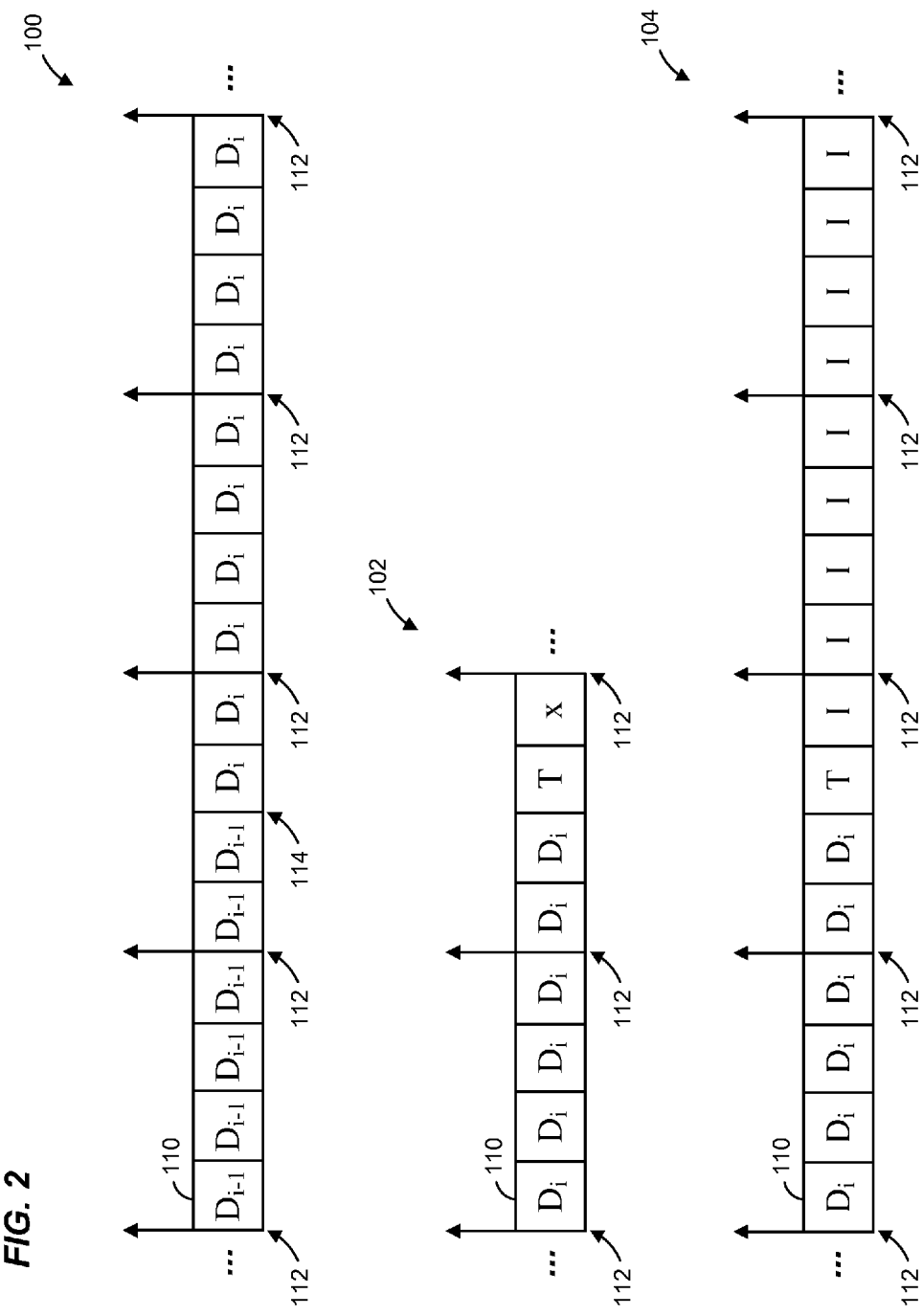
FIG. 2 is a diagram of various example XGMII data streams converted from respective GMII data streams, according to one embodiment and various scenarios.

FIG. 2 is a diagram of various example XGMII data streams 100, 102, and 104 that were converted from respective GMII data streams, according to an embodiment. In an embodiment, and with reference to FIG. 1, the XGMII data streams 100, 102, and 104 are data streams that are generated by the converter 16 based on respective GMII data streams received from MAC 12, and then provided to the 10GBASE-R PCS 20. In the embodiment of FIG. 2, each box (e.g., box 110) of a data stream represents a single byte, and each demarcation 112 is a boundary between words of the XGMII data stream. Thus, using the nomenclature described above, XGMII data stream 100 represents a data stream including bytes having a format /D/D/D/D /D/D/D/D /D/D/D/D /D/D/D/D, XGMII data stream 102 represents a data stream including bytes having a format /D/D/D/D /D/D/T/x (where "x" is an unspecified byte), and XGMII data stream 104 represents a data stream including bytes having a format /D/D/D/D /D/D/T/I /I/I/I/I /I/I/I/I. The subscripts of each data byte /D in FIG. 2 indicate which XGMII data byte corresponds to which GMII data byte. In particular, FIG. 2 represents scenarios in which a GMII data packet includes i data bytes ($D_1, \ldots D_{i-1}, D$) that are each replicated 10 times in the corresponding XGMII data stream 100, 102, or 104.

XGMII data stream 100 corresponds to an example scenario in which a data packet of an original, GMII data stream includes an even number of data bytes (i.e., i is an even number), according to an embodiment. As seen in FIG. 2, a last repetition of the last data byte of the packet (D) immediately precedes a word boundary 112. XGMII data stream 102 corresponds to an example in which a data packet of an original, GMII data stream instead includes an odd number of data bytes (i.e., i is an odd number), according to an embodiment. As seen in FIG. 2, a last repetition of $D_i$ in this case falls in the middle of a word.

In some embodiments, however, an inter-packet gap (IPG), or interframe gap, which includes one or more idle bytes, is located between GMII data packets. In an embodiment, each idle byte of an IPG within the GMII data stream is (like each data byte) generally replicated 10 times to form the XGMII data stream. XGMII data stream 104 corresponds to an embodiment and scenario in which a GMII data packet with an odd number of data bytes (i.e., i is an odd number, as in XGMII data stream 102) is followed by a single GMII idle byte. As seen in FIG. 2, 10 repetitions of a single GMII idle byte cause a combination of the XGMII data packet and XGMII IPG to end at a word boundary 112. More generally, in an embodiment, a GMII data packet/IPG pair, when converted to XGMII, ends at a word boundary 112 when the number of data bytes in the GMII data packet, plus the number of idle bytes in the IPG that follows the GMII data packet, is an even number, and ends in the middle of a word when the number of data bytes in the GMII data packet, plus the number of idle bytes in the IPG that follows the GMII data packet, is an odd number. This latter scenario, in which the IPG ends in the middle of a word, can be problematic. For example, a second data packet immediately following the IPG would cause a start-of-packet byte IS to occur in the middle of a word, in violation of the XGMII coding requirement noted above.

To ensure that the XGMII IPG following the XGMII data packet always ends on a word boundary 112 in the XGMII data stream, in an embodiment, the number of replicated idle bytes is selectively modified to be a number less than or greater than 10 in each case where there is an odd number of bytes in the data packet/IPG pair. For example, in one embodiment, if the XGMII data packet/IPG pair contains an odd number of bytes, two idle bytes are added to, or removed from, the XGMII IPG. In this manner, a next XGMII data packet can start immediately after a word boundary 112, as required by the IEEE 802.3ae Standard. Adding or removing idle bytes relative to the desired 10× replication, however, creates a surplus or deficit, respectively, in a number of bytes needed to sustain the 10 Gbps XGMII data stream. To maintain, on average, a 10× conversion ratio, in an embodiment, a counter (e.g., within the converter 16 of FIG. 1) keeps track of a number of words or bytes that have been added or removed relative to the number of words or bytes needed for 10× replication. According to various embodiments, the counter value maps to a surplus (or deficit) of words or bytes in different ways. For example, in one embodiment, a counter value of zero corresponds to no surplus or deficit of words, a counter value of +1 corresponds to a surplus of one-half of a word, a counter value of +2 corresponds to a surplus of one word, a counter value of −1 corresponds to a deficit of one-half of a word, a counter value of −2 corresponds to a deficit of one word, etc.

In one embodiment, whether idle bytes are added or removed to align the end of the XGMII IPG with a word boundary 112 is determined by checking the counter value, and choosing whichever option will cause the counter value to be closest to zero (e.g., adding idle bytes if the counter value is negative, and removing idle bytes if the counter value is positive, in one embodiment). In an embodiment, the counter is then updated after the idle bytes are added or removed. For example, in an embodiment, the counter value is incremented to reflect a number of idle bytes that are added, or is decremented to reflect a number of idle bytes that are removed, relative to 10× replication. In one embodiment, a default action of removing idle bytes occurs when a counter value equals zero. In another embodiment, a default action of adding idle bytes occurs when a counter value equals zero. In some embodiments, a counter is not utilized, and idle bytes are simply added and removed in an alternating fashion. In still other embodiments, other suitable techniques are used to push the average replication ratio to 10×.

The technique of adding and removing idle bytes described above may frequently result in an XGMII IPG with a number of idle bytes that is not an integer multiple of 10, in which case straightforward 1/10 downsampling of the XGMII data stream on the receive side (e.g., in a converter of a PHY, not shown in FIG. 1, that is coupled to the PHY 14) can cause misalignment issues. Accordingly, in an embodiment, downsampling is realigned to the beginning of each XGMII data packet.

Figure 3:
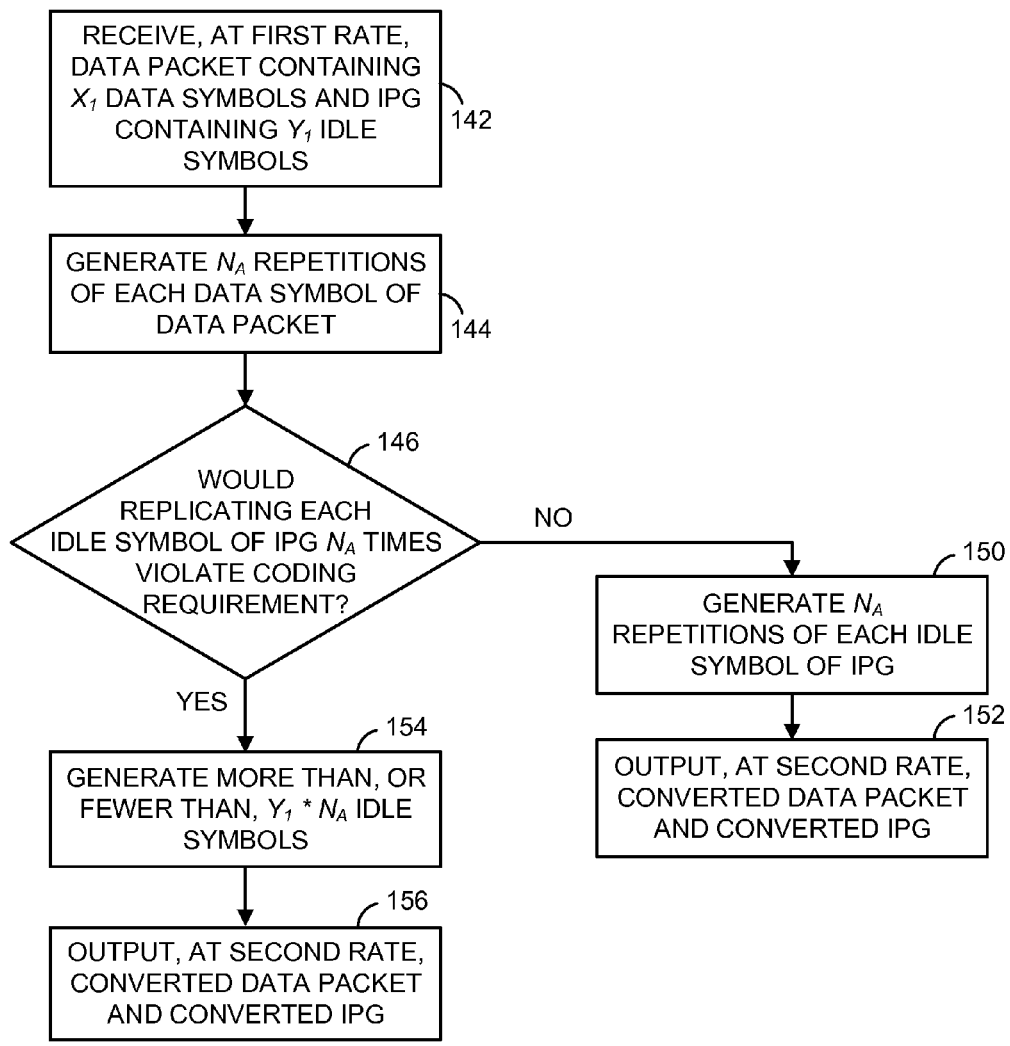
FIG. 3 is a flow diagram of an example method for converting a data stream from a first rate to a higher, second rate such that the converted data stream conforms to a set of coding requirements, according to an embodiment.

While FIG. 2 corresponds to various scenarios for one particular embodiment in which a GMII data stream is converted to an XGMII data stream (and then provided to a 10GBASE-R PCS), the techniques described above may be applied more generally to other interfaces and/or PCSs. FIG. 3 is a flow diagram of an example method 140 for converting a data stream from a first rate to a second rate $N_A$ times greater than the first rate, such that the converted data stream conforms to a set of coding requirements, according to an embodiment. The coding requirements include coding requirements of a media-independent interface (e.g., XGMII), and/or coding requirements of a PCS (e.g., 10GBASE-R), in various embodiments. In an embodiment, the method 140 is implemented by a converter similar to the converter 16 of FIG. 1.

At block 142, a data packet containing $X_1$ data symbols, and an IPG containing $Y_1$ idle symbols, are received at the lower, first rate. In various embodiments, a "symbol" is a byte, a bit, or another unit of information. In the example XGMII data streams 100, 102, and 104 of FIG. 2, for example, each data symbol and each idle symbol is one byte in length. In one embodiment, the data packet and IPG are received from a MAC similar to MAC 12 of FIG. 1. In an embodiment, the IPG is received immediately after the data packet is received (i.e., the first idle symbol of the IPG immediately follows the last data symbol of the data packet).

At block 144, $N_A$ repetitions of each data symbol of the data packet received at block 142 are generated. In an embodiment, all repetitions of a single data symbol are generated in a contiguous manner, such that each repetition immediately follows the previous repetition (e.g., as shown in FIG. 2). In other embodiments, the repetitions generated at block 144 are arranged in another suitable manner.

At block 146, it is determined whether replicating each idle symbol of the IPG received at block 142 $N_A$ times would violate a set of one or more coding requirements, including at least a requirement that information symbols be arranged in units of a symbol length M, in an embodiment. The determination at block 146 is made in various different ways in various different embodiments. For example, in some embodiments, it is determined at block 146 whether $(X_1+Y_1)*N_A$ has a non-zero remainder when divided by M, where a non-zero remainder corresponds to a violation of the coding requirement. In some of these embodiments, the quantity $((X_1+Y_1)*N_A)/M$ is expressly calculated to determine whether the remainder is zero. In other embodiments, however, whether the remainder is zero is only impliedly determined. For example, in one embodiment, $Y_1*N_A$ repetitions of the idle symbol are first generated and appended to the $X_1*N_A$ data symbols generated at block 144, and it is then determined at block 146 whether the last repetition of the last idle symbol falls on a boundary between units of length M. In this example embodiment, a determination that the last repetition does not fall on such a boundary corresponds to a non-zero remainder (i.e., a violation of the coding requirement). In another example embodiment, where $N_A$ and M are known a priori to have certain properties (e.g., a property that $((X_1+Y_1)*N_A)/M$ has a binary remainder of either 0 or 1), it is simply determined at block 146 whether $X_1+Y_1$ is even or odd. In this example embodiment, a determination that $X_1+Y_1$ is odd corresponds to a non-zero remainder (i.e., a violation of the coding requirement).

If it is determined at block 146 that replicating each idle symbol of the IPG received at block 142 $N_A$ times would not violate the requirement of the set of coding requirements, flow proceeds to block 150. At block 150, $N_A$ repetitions of each idle symbol of the IPG received at block 142 are generated. At block 152, a converted data packet containing the $N_A$ repetitions of each data symbol (generated at block 144), and a converted IPG containing the $N_A$ idle symbols (generated at block 150), are output at the higher, second rate. In an embodiment, the converted IPG is output immediately after the converted data packet. The converted data packet and converted IPG are output to a PCS such as the PCS 20 of FIG. 1, in an embodiment. In other embodiments, the converted data packet and converted IPG are output to a different portion of a PHY.

If it is instead determined at block 146 that replicating each idle symbol of the IPG received at block 142 $N_A$ times would violate the requirement of the set of coding requirements, flow proceeds to block 154. At block 154, either more than $Y_1*N_A$ idle symbols or fewer than $Y_1*N_A$ idle symbols (i.e., more than or fewer than the number of idle symbols that would result from $N_A$-times replication of each idle symbol in the IPG received at block 142) are generated. In an embodiment, whether more or fewer than $Y_1*N_A$ idle symbols are generated is determined based on a counter value (e.g., a value of a counter within a converter similar to converter 16 of FIG. 1), where the counter is used to maintain, on average, a number of output symbols per input symbol that matches the desired conversion ratio $N_A$. In an embodiment, a counter value maps to a current deficit or surplus of symbols created by prior additions and/or subtractions of idle symbols. For example, in one embodiment, counter values of −2, −1, 0, +1, and +2 correspond to a deficit of four symbols, a deficit of two symbols, no deficit or surplus of symbols, a surplus of two symbols, and a surplus of four symbols, respectively. In various embodiments, the counter value is reset to zero on a periodic basis (e.g., at the end of a predefined time window), whenever a new packet flow is detected, and/or at one or more other suitable times.

In some embodiments, the number of idle symbols to be generated at block 154 is selected from a set of numbers of symbols that would each prevent the coding requirement from being violated. For example, in an embodiment and scenario where $N_A=10$ and M=4, and where $(X_1+Y_1)*N_A/M$ has a non-zero remainder, the number of idle symbols is selected from the set {8, 12}, where either eight idle symbols or 12 idle symbols (rather than $N_A=10$ idle symbols) would prevent the coding requirement from being violated. In one embodiment where a counter is utilized, the value from the set that causes the counter value to move closest to zero is selected. For the scenario above, for example, eight idle symbols are generated if the counter value is positive, and 12 idle symbols are generated if the counter value is negative, in an embodiment. In various other example embodiments, other suitable algorithms are used to select a number of idle symbols based on a current counter value.

At block 156, a converted data packet containing the replicated data symbols generated at block 144, and a converted IPG containing the idle symbols generated at block 154, are output at the higher, second rate. In an embodiment, block 156 is similar to block 152. In one embodiment, the number of idle symbols generated at block 154 is a number that causes the combination of the converted data packet and the converted IPG output at block 156 to contain an integer number of units of symbol length M, thereby ensuring that the requirement that information symbols be arranged in units of symbol length M is not violated.

In other embodiments, the method 140 includes additional blocks not seen in FIG. 3, and/or omits certain blocks that are included in FIG. 3. For example, in one embodiment, the method 140 includes additional blocks for receiving control information and inserting repetitions of a corresponding ordered set into the data stream that is output at the second rate (e.g., in a manner similar to that described below with reference to FIG. 5 or FIG. 6). In another example embodiment, where the number of idle symbols generated at block 154 is selected based on a counter value, the method 140 includes a block, prior to block 154, in which the counter value is determined, and/or a block in which the counter value is incremented or decremented to reflect the deficit or surplus caused by the difference between (1) the number of idle symbols generated at block 154 and (2) the $Y_1*N_A$ idle symbols that would have been generated using straightforward $N_A$-times replication. Alternatively, in some embodiments, other suitable steps are taken to guarantee that the desired $N_A$-times conversion rate is preserved. For example, in one embodiment, fewer than $Y_1*N_A$ idle symbols are generated at block 154 for every iteration of the method 140, and sequences of idle and/or control symbols are periodically inserted to make up for the resulting symbol deficits. In some embodiments, the blocks of method 140 occur in a different order than seen in FIG. 3. For example, in one embodiment, block 154 or block 150 occurs before (and/or simultaneously with) block 144. In some scenarios, the entire method 140 is repeated for a plurality of data packet/IPG pairs.

The flow of the method 140 is now briefly described with reference to a more specific example embodiment and scenario, in which the converter 16 of FIG. 1 converts a 1 Gbps GMII data stream to a 10 Gbps XGMII data stream (i.e., $N_A=10$) subject to the XGMII coding requirement that data be arranged in four-byte units (i.e., each "symbol" is equal to one byte, and M=4). At block 142, in this embodiment and scenario, the converter 16 receives a data packet and IPG of the GMII data stream, where the GMII data packet contains $X_j$ data bytes and the GMII IPG contains $Y_1$ idle bytes. At block 144, the converter 16 generates $N_A=10$ repetitions of each data byte of the GMII data packet. At block 146, the converter 16 determines whether replicating each idle byte of the GMII IPG $N_A=10$ times would violate the XGMII coding requirement that data be arranged in four-byte units. In one embodiment, the determination at block 146 is made by determining whether the total number of GMII data and idle bytes $(X_1+Y_1)$ is an odd or even number, where an odd number corresponds to a violation of the XGMII coding requirement.

Continuing with this example embodiment and scenario, the converter 16 either generates $N_A=10$ repetitions of each idle symbol of the GMII IPG at block 150, or generates more than, or fewer than, 10 repetitions of each idle symbol of the GMII IPG at block 154. In an embodiment, eight or 12 repetitions of each idle symbol of the GMII IPG are generated at block 154, in order to ensure that the IPG ends on a word boundary. In an embodiment, either eight or 12 repetitions are selected based on a counter value (e.g., by selecting whichever number of repetitions causes the counter to move closer to zero), and the counter value is updated to reflect whether fewer (eight) or more (12) idle bytes were generated relative to the desired, average 10× repetition rate. The converter 16 then outputs the converted, XGMII data packet and IPG to the PCS 20, in an embodiment, at block 152 or 156.

Figure 4:
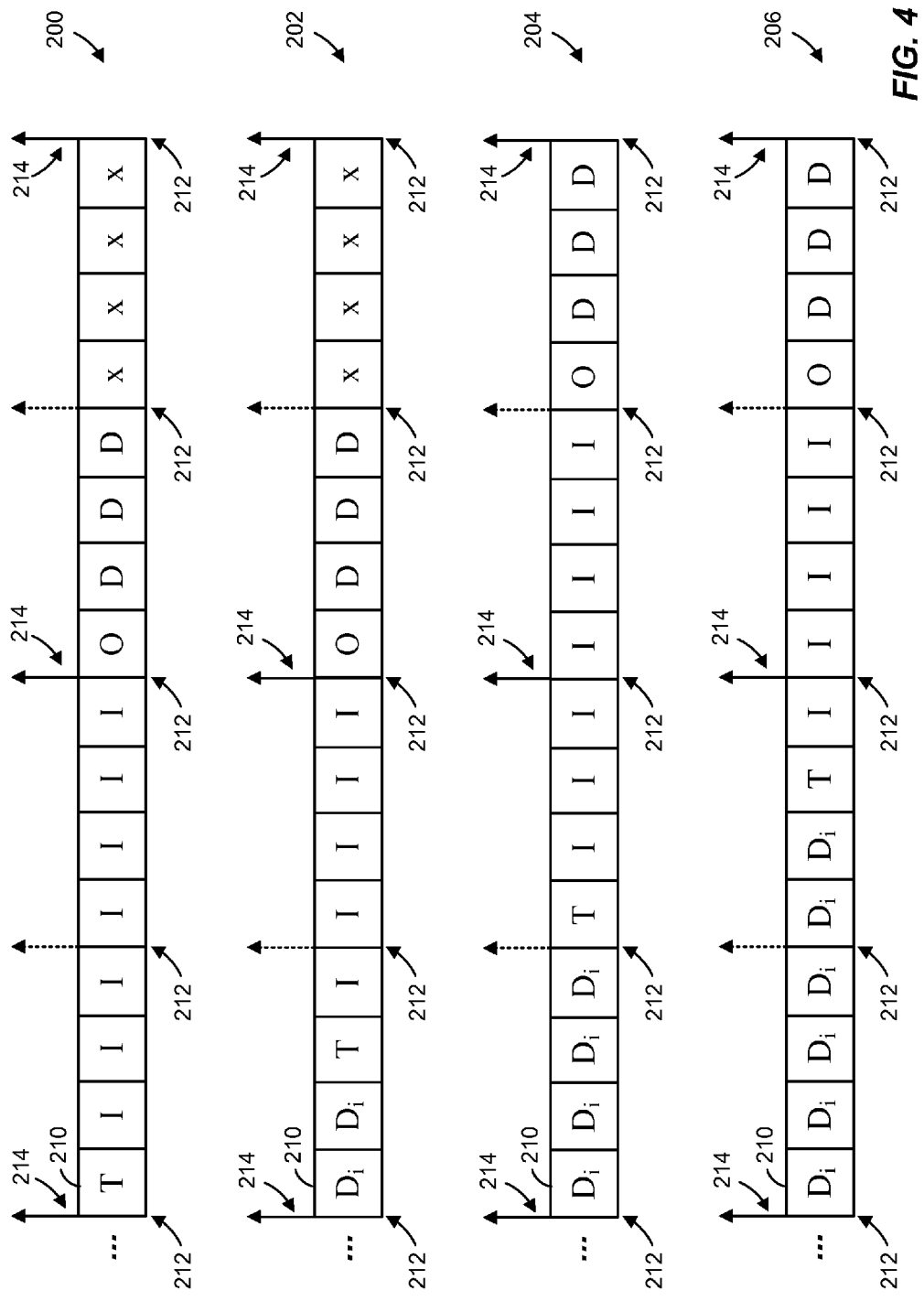
FIG. 4 is a diagram of various example XGMII data streams, converted from respective GMII data streams, that each include an ordered set after a data packet, according to one embodiment and various scenarios.

In some embodiments and scenarios, a GMII data packet is received along with control information that is mapped to an ordered set to be inserted in the converted, XGMII data stream. As noted above, however, neither 10GBASE-R nor XGMII allow an ordered set to be located immediately after the end of a data packet (i.e., without any intervening idles). Accordingly, in one embodiment, a number of idle bytes are inserted between the end of the converted, XGMII data packet and the ordered set. FIG. 4 is a diagram of four example XGMII data streams 200, 202, 204, and 206 in which idle bytes are inserted between the XGMII data packet and the ordered set, with each example data stream corresponding to a different location, within a 10GBASE-R block, of the last data byte of the XGMII data packet. In FIG. 4, each box 210 represents a data byte, each demarcation 212 is a word boundary, and each demarcation 214 is a block boundary. Thus, the first two words of each example XGMII data stream 200, 202, 204, or 206 correspond to a first block formed by a 10GBASE-R PCS (e.g., PCS 20 of FIG. 1) that will receive the XGMII data stream, and the second two words of each example XGMII data stream 200, 202, 204, or 206 correspond to a second block formed by the 10GBASE-R PCS that will receive the XGMII data stream, in an embodiment. The four "x" bytes in each of data streams 200 and 202 represent the first four bytes of the next XGMII word, in an embodiment.

XGMII data streams 200 and 204 correspond to scenarios in which the GMII data packet included an even number of data bytes (causing the converted, XGMII data packet to end at a word boundary 212), and XGMII data streams 202 and 206 correspond to cases in which the GMII data packet included an odd number of data bytes (causing the converted, XGMII data packet to end in the middle of a word). XGMII data streams 200 and 202 are similar to XGMII data streams 204 and 206, respectively, except that the end-of-packet byte IT of the XGMII data packet is within the second word of a block rather than the first word of a block.

In the example embodiment and scenarios of FIG. 4, a number of idle bytes is inserted in the XGMII data stream to satisfy the XGMII coding requirements that an ordered set cannot immediately follow a data packet, and that bytes must be arranged in four-byte (one word) units. Moreover, in this embodiment, enough idle bytes are inserted to satisfy the coding requirements of 10GBASE-R, which is unable to encode a block /T/I/I/I/ O/D/D/D or a block /D/D/T/I/ O/D/D/D. In particular, in this embodiment, eight idle bytes are inserted between the last data byte of the packet and the ordered set in data streams 200 and 204, and six idle bytes are inserted between the last data byte of the packet and the ordered set in data streams 202 and 206. Thus, the total number of bytes occupied by the ordered set and inserted idle bytes is 12 bytes for XGMII data stream 200 and XGMII data stream 204 (i.e., eight idle bytes plus four ordered set bytes), and the total number of bytes occupied by the ordered set and inserted idle bytes is 10 for XGMII data stream 202 and XGMII data stream 206 (i.e., six idle bytes plus four ordered set bytes). In an embodiment where the ordered set /O/D/D/D corresponds to a single byte of control information in the original, GMII data stream, the data streams 200 and 204 therefore include two extra bytes relative to the desired average 10× conversion rate, and the data streams 202 and 206 do not include any surplus or deficit of bytes relative to the desired average 10× conversion rate. Accordingly, in an embodiment, a counter value is incremented to reflect the two extra bytes when XGMII data stream 200 or XGMII data stream 204 is generated, but is left unchanged when XGMII data stream 202 or XGMII data stream 206 is generated.

In an embodiment, a converter (e.g., the converter 16 of FIG. 1) recognizes when control information (e.g., indicating a collision associated with a data packet, indicating carrier extension associated with a packet, etc.) is received that should, but for XGMII and/or 10 GBASE-R coding restrictions, map to an ordered set that immediately follows a data packet. The converter then encodes the XGMII data stream in accordance with the appropriate one of data streams 200, 202, 204, or 206 (e.g., depending on whether the GMII data packet includes an odd or even number of bytes, and on the location of the block boundaries relative to the end of the XGMII data packet). On the receive side, another converter (e.g., in a PHY not shown in FIG. 1) recognizes that the sequences of data streams 200, 202, 204, and 206 each correspond to control information that should immediately follow the data packet, and processes the data accordingly, in an embodiment.

In some embodiments and/or scenarios where a 10 Mbps or 100 Mbps MII data stream is converted to a 10 Gbps XGMII data stream, the corresponding 1000× or 100× repetition, respectively, causes the end of each converted, XGMII data packet to fall on a word boundary 212, regardless of whether the MII data packet included an odd or an even number of data bytes prior to conversion. Thus, when an ordered set follows an XGMII data packet converted from an MII data packet, the converter generates the XGMII data stream 200 or the XGMII data stream 204, in an embodiment. In these embodiments and/or scenarios, however, the ordered set /O/D/D/D is repeated either 248 times (when converting a 10 Mbps MII data stream to XGMII) or 23 times (when converting a 100 Mbps MII data stream to XGMII) in order to achieve the desired 1000× or 100× conversion rate, respectively.

In some embodiments and scenarios, a GMII data stream is received with control information that maps to a series of consecutive ordered sets to be included in the XGMII data stream. While a first ordered set following an XGMII data packet is, in some embodiments, arranged as described above with reference to FIG. 4 (e.g., by inserting a number of idle bytes before a single repetition of the ordered set), ordered sets that immediately follow another ordered set are in some embodiments handled differently. FIGS. 5A-5D are diagrams of various example XGMII data streams, each converted from a GMII data stream and including a series of ordered sets after an XGMII data packet, according to various scenarios. In FIGS. 5A-5D, each box 302 represents a data byte, each demarcation 312 is a word boundary, and each demarcation 314 is a block boundary. Thus, for example, the first two words of the XGMII data stream 320 (/T/I/I/I /I/I/I/I) correspond to a first block formed by a 10GBASE-R PCS that receives the XGMII data stream 320, and the second two words of the XGMII data stream 320 (/O/1/1/1 /O/2/2/2) correspond to a second block formed by the 10GBASE-R PCS that receives the XGMII data stream 320, in an embodiment. For clarity, different ordered sets are assigned different numbers in FIGS. 5A-5D, with the first ordered set labeled as /O/1/1/1, and with each repetition of the second ordered set labeled as /O/2/2/2. In one embodiment, each ordered set shown corresponds to a single byte of control information received in, or otherwise associated with, the GMII data stream.

Figure 5A:
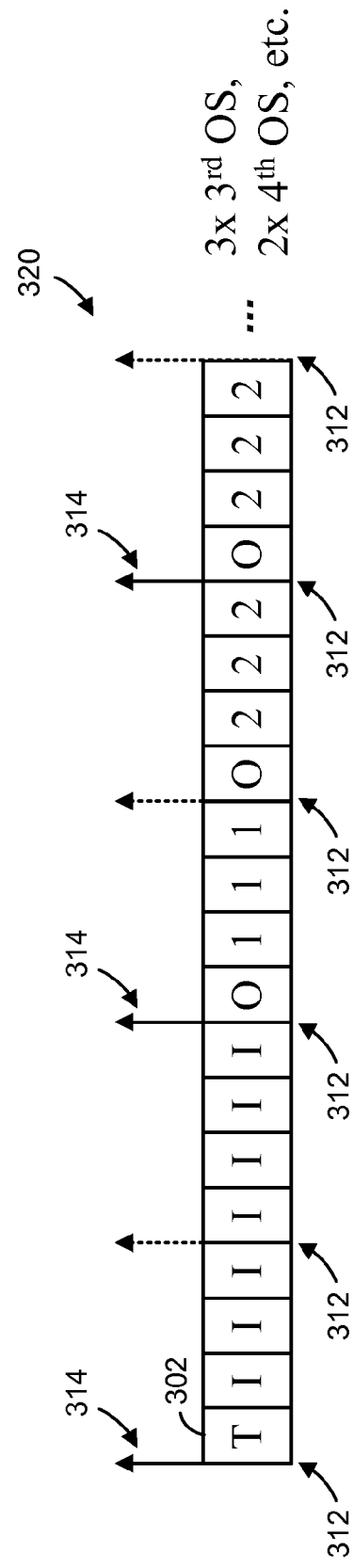
Figure 5B:
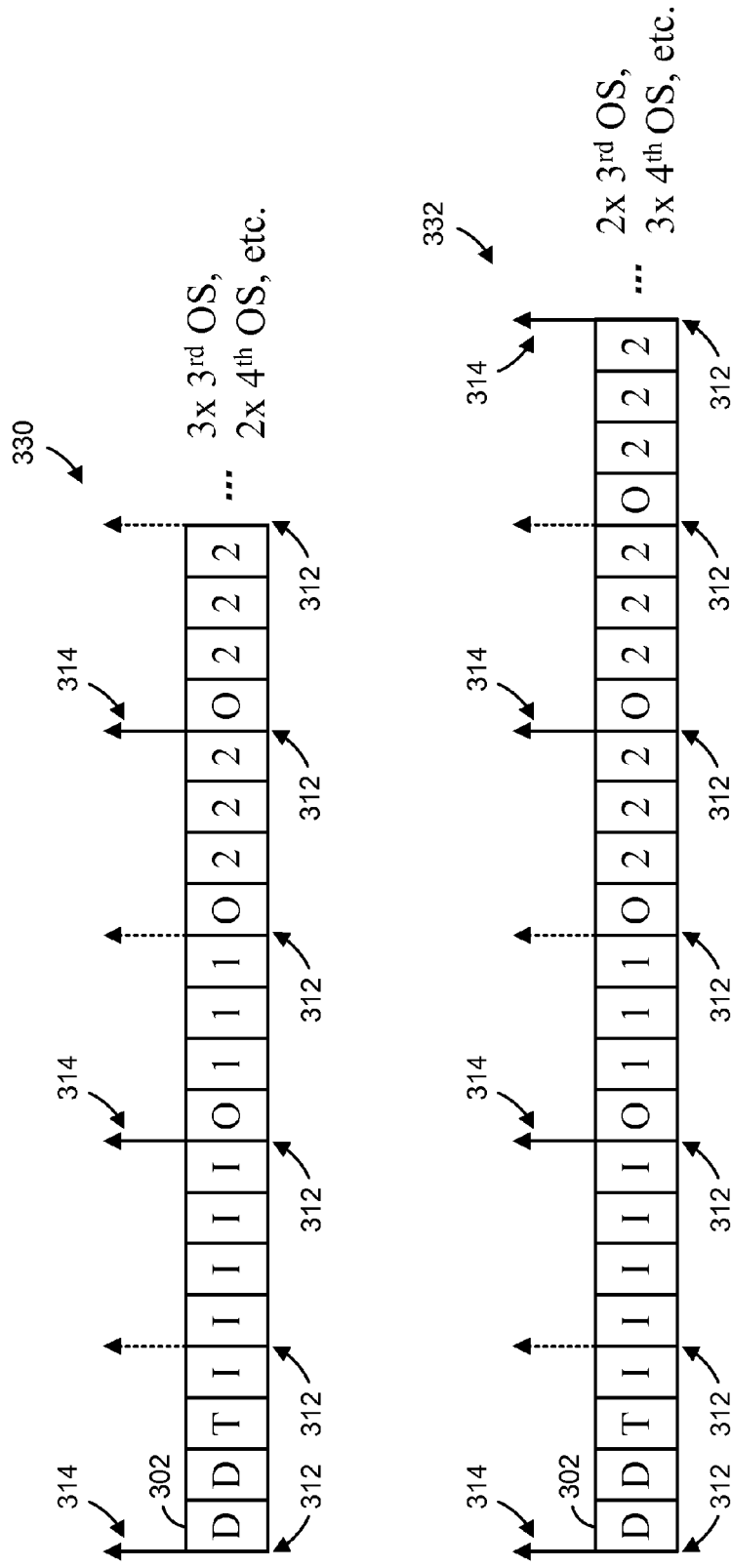
Figure 5C:
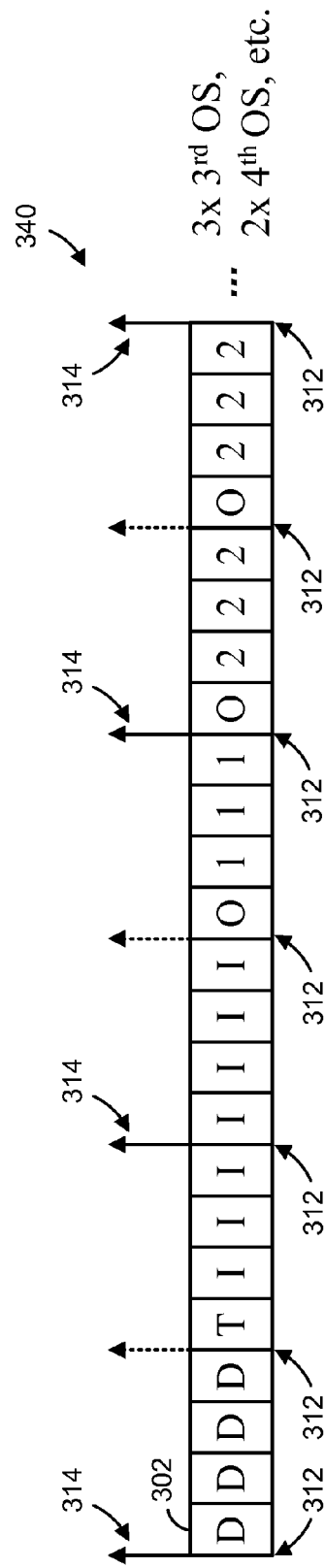

Each figure of FIGS. 5A-5D corresponds to a different transition scenario between the converted, XGMII data packet and the first ordered set in the series. In particular, FIG. 5A shows an example XGMII data stream 320 in which the last data byte of the XGMII data packet falls just before a block boundary 314 (e.g., as in XGMII data stream 200 of FIG. 4), FIG. 5B shows two example XGMII data streams 330, 332 in which the last data byte of the XGMII data packet falls in the middle of the first word of a block (e.g., as in XGMII data stream 202 of FIG. 4), FIG. 5C shows an example XGMII data stream 340 in which the last data byte of the XGMII data packet falls just before the word boundary 312 in the middle of a block (e.g., as in XGMII data stream 204 of FIG. 4), and FIG. 5D shows two example XGMII data streams 350, 352 in which the last data byte of the XGMII data packet falls in the middle of the second word of a block (e.g., as in XGMII data stream 206 of FIG. 4).

In the scenarios and embodiments of FIGS. 5A-5D, at least the second ordered set in a series of consecutive ordered sets is repeated either two or three times in the XGMII data stream. In these embodiments, the number of repetitions depends at least in part on the length and/or number of repetitions of the previous ordered set, such that the conversion ratio, on average, approaches the desired value of 10×. Moreover, in the example embodiments of FIGS. 5A-5D, any idle bytes inserted between the XGMII data packet and the first ordered set /O/1/1/1 (as discussed with reference to FIG. 4) are counted towards the length or number of repetitions of the first ordered set for purposes of determining the length or number of repetitions of the next ordered set.

In the XGMII data stream 320 of FIG. 5A, for example, the eight idle bytes between the XGMII data packet (not seen in FIG. 5A because the data bytes end just before the /T end-of-packet byte) and the first ordered set (/O/1/1/1) are counted towards the length of the first ordered set, for a total length of 12 bytes. Thus, the XGMII data stream includes only two repetitions of the second ordered set (/O/2/2/2), for a total length of eight bytes. In scenarios where the series of ordered sets includes additional ordered sets, the third ordered set (/O/3/3/3) is repeated three times (because the second ordered set was repeated twice), the fourth ordered set (O/4/4/4) is repeated two times (because the third ordered set was repeated three times), etc. In this manner, an average replication rate approaching 10× is achieved.

Similarly, in the XGMII data streams 330 and 332 of FIG. 5B, the six idle bytes between the data packet and the first ordered set (/O/I/I/I) count towards the length of the first ordered set, for a total length of 10 bytes. In this case, the first ordered set (including inserted idle bytes) does not create any surplus or deficit of bytes with respect to the desired average 10× replication rate. Thus, the choice of whether to replicate the second ordered set /O/2/2/2 two or three times is instead made by determining whether a counter value is positive or negative, in an embodiment, where the counter keeps a running total of the surplus or deficit of words or bytes relative to the desired average 10× conversion rate. For example, in one embodiment, the counter is similar to or the same as the counter discussed above with respect to FIGS. 2 and 3 (i.e., a counter that is incremented or decremented when idle bytes are added or removed to align the end of an IPG with a word boundary). The example XGMII data stream 330 corresponds to a scenario in which the counter value is positive, and thus only two repetitions of the second ordered set are included in the XGMII data stream 330. Conversely, the example XGMII data stream 332 corresponds to a scenario in which the counter value is negative, and thus three repetitions of the second ordered set are included in the XGMII data stream 332. In an alternative embodiment, the choice of two versus three repetitions of the second ordered set is instead made by determining whether three or two repetitions of an ordered set were included the last time a similar decision was made (e.g., by determining a flag value), without utilizing a counter. In some embodiments and scenarios where the series of ordered sets includes additional ordered sets, the additional ordered sets (e.g., /O/3/3/3, /O/4/4/4, etc.) are repeated two or three times depending on the length of the previous ordered set, as shown in FIG. 5B. Again, in this manner, an average replication rate approaching 10× is achieved.

The example XGMII data stream 340 of FIG. 5C is similar to the example XGMII data stream 320 of FIG. 5A, with the exception that the XGMII data packet ends at a mid-block word boundary 312 rather than a block boundary 314. Thus, in this scenario, the second ordered set is repeated twice because the first ordered set (including inserted idle bytes) is 12 bytes long, the third ordered set (if any) is repeated three times because the second ordered set is repeated twice, the fourth ordered set (if any) is repeated twice because the third ordered set is repeated three times, etc.

The example XGMII data streams 350 and 352 of FIG. 5D are similar to the example XGMII data streams 330 and 332, respectively, of FIG. 5B, with the exception that the XGMII data packet ends at the middle of the second word of a block rather than the middle of the first word of a block. As in FIG. 5B, the first XGMII data stream 350 corresponds to a scenario in which a counter value is positive and the second XGMII data stream 352 corresponds to a scenario in which a counter value is negative, in an embodiment. Thus, in these embodiments and scenarios, the second ordered set of the first XGMII data stream 350 is repeated twice (with the third ordered set being repeated three times, the fourth ordered set being repeated twice, etc.), and the second ordered set of the second XGMII data stream 352 is repeated three times (with the third ordered set being repeated twice, the fourth ordered set being repeated three times, etc.).

In some embodiments, any ordered set that immediately precedes the start of a next data packet is only repeated two times in the XGMII data stream, regardless of any counter value and/or regardless of the length or number of repetitions of any previous ordered set in the XGMII data stream. By including only two repetitions (e.g., eight bytes) of the ordered set, a counter value can be pushed in a negative direction, which can help to counteract any positive counter value bias (e.g., positive bias caused by idle byte padding of ordered sets that immediately follow a data packet), in some embodiments. In some embodiments, if a GMII data stream includes idle bytes that are to be replicated and inserted in the XGMII data stream immediately after an ordered set, those idle bytes are reduced in number to drain down the counter value.

As seen in the example embodiments of FIGS. 4 and 5A-5D, a number of idle bytes (e.g., six or eight idle bytes) may be inserted between a data packet and an ordered set in a converted (e.g., XGMII) data stream even if no idle bytes were included in the lower-rate (e.g., GMII) data stream. Thus, a device or module receiving the converted data stream may not be able to immediately determine whether the idle bytes after a data packet are extra, inserted idle bytes, or replicated idle bytes that were included in the original, lower-rate data stream. Thus, in an embodiment, a device or module receiving a series of idle bytes following a data packet in a converted data stream waits an amount of time sufficient to determine whether the idle bytes are replicates of idle bytes in the original data stream, or are instead idle bytes that were inserted during the conversion process. For example, in one embodiment, a device or module receiving an XGMII data stream determines that idle bytes immediately following a data packet are replicates of idle bytes in the GMII data stream unless one of the transitional patterns in FIG. 4 or 5A-5D (i.e., /T/I/I/I /I/I/I/I /O/D/D/D /x/x/x/x, /D/D/T/I /I/I/I/I /O/D/D/D /x/x/x/x, /D/D/D/D /T/I/I/I /I/I/I/I /O/D/D/D, or /D/D/D/D /D/D/T/I /I/I/I/I /O/D/D/D) is detected.

Figure 6A:
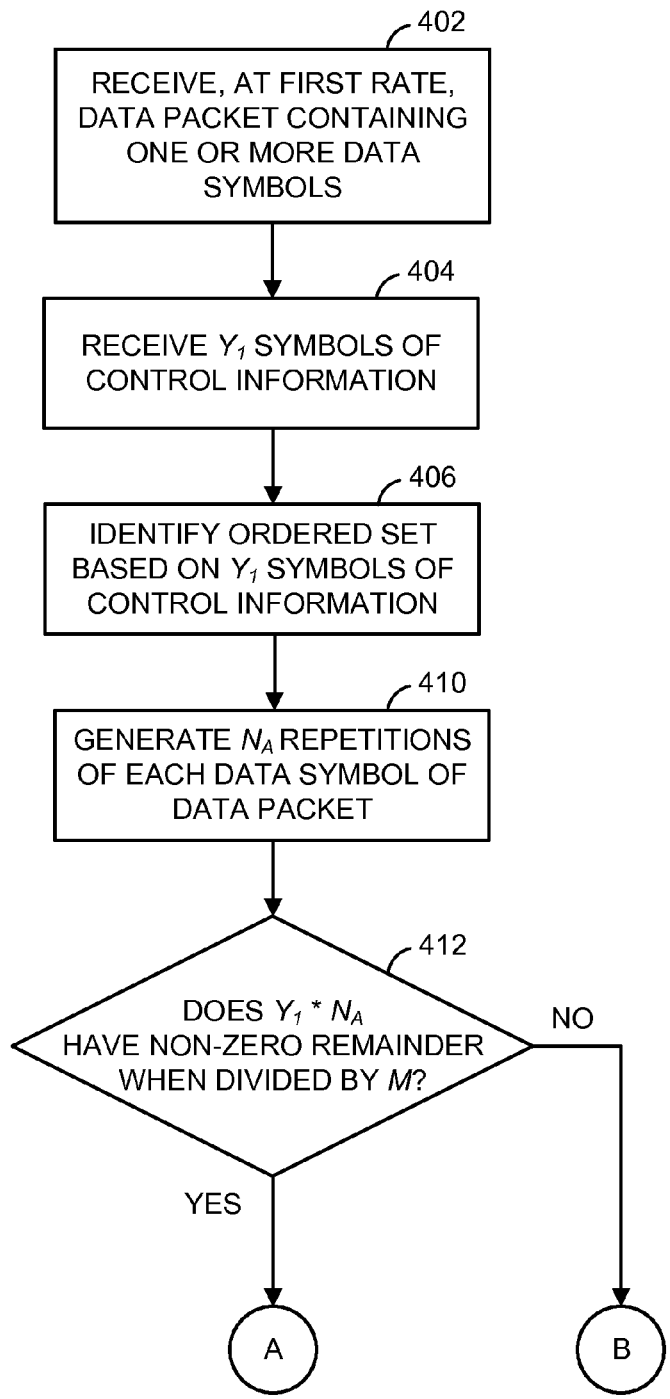
FIGS. 6A-6B are flow diagrams of an example method for inserting one or more ordered sets into a data stream converted from a first rate to a higher, second rate, such that the converted data stream conforms to a set of coding requirements, according to an embodiment.
Figure 6B:
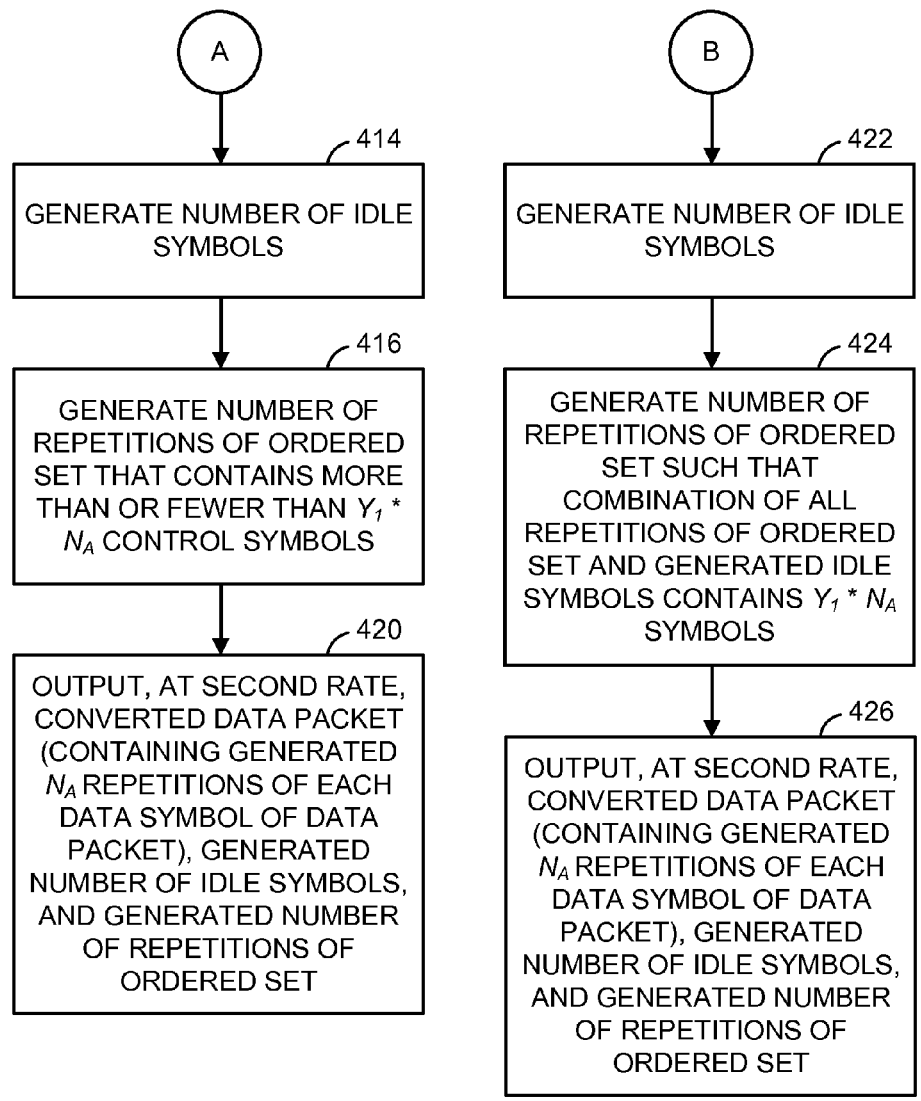

While FIGS. 5A-5D correspond to various scenarios for one particular embodiment in which a GMII data stream is converted to an XGMII data stream (and then provided to a 10GBASE-R PCS), the techniques described above may be applied more generally to other interfaces and/or PCSs. FIGS. 6A-6B are flow diagrams of an example method 400 for inserting one or more ordered sets into a data stream converted from a first rate to a second rate $N_A$ times higher than the first rate, such that the converted data stream conforms to a set of one or more coding requirements, according to an embodiment. The coding requirements include coding requirements of a media-independent interface (e.g., XGMII), and/or coding requirements of a PCS (e.g., 10GBASE-R), in various embodiments. The set of coding requirements includes at least a requirement that information symbols be arranged in units of a symbol length M, in an embodiment, where a "symbol" is a byte, bit, or other unit of information according to various different embodiments. In one embodiment, the method 400 is implemented by a converter similar to the converter 16 of FIG. 1.

At block 402, a data packet containing one or more data symbols is received at the lower, first rate. In one embodiment, the data packet is received from a MAC similar to MAC 12 of FIG. 1.

At block 404, $Y_1$ symbols of control information are received. In one embodiment and/or scenario, the control information is received at the first rate, as a part of the data stream that included the data packet received at block 402. In another embodiment and/or scenario, the control information is received external to the data stream that included the data packet received at block 402. In some embodiments and/or scenarios, only one symbol is received at block 404 (i.e., $Y_1=1$). The control information represents any of various types of control information, according to different embodiments or scenarios. In one embodiment and scenario, for example, the control information indicates a collision associated with the data packet received at block 402. In other example embodiments and scenarios, the control information indicates a carrier extension, or carrier extension with collision, associated with the data packet received at block 402. In still other embodiments, the control information represents data rate information, such as a mode change associated with autonegotiation, for example. In some embodiments, however, control information relating to data rate/mode is handled in a manner that is different than that depicted in the method 400, e.g., as described further below.

At block 406, an ordered set is identified based on the $Y_1$ symbols of control information received at block 404. In an embodiment, the ordered set is identified by mapping the control information received at block 404 to the ordered set (e.g., by accessing an index stored in a memory). In an embodiment, the ordered set contains O control symbols, where $N_A$ is not an integer multiple of O. In some embodiments, O is equal to the symbol length M dictated by the coding requirement.

At block 410, $N_A$ repetitions of each data symbol of the data packet (received at block 402) are generated. In an embodiment, all repetitions of a single data symbol are generated in a contiguous manner, such that each repetition immediately follows the previous repetition (e.g., as shown in FIG. 2). In other embodiments, the repetitions generated at block 410 are arranged in another suitable manner.

At block 412, it is determined whether $Y_1*N_A$ has a non-zero remainder when divided by M. In some embodiments, the quantity $Y_1*N_A/M$ is expressly calculated to determine whether the remainder is zero. In other embodiments, however, whether the remainder is zero is only impliedly determined. For example, in one embodiment where the control information received at block 402 is known, a priori, to only occupy a particular number of symbols (i.e., $Y_1$ is known), and where M is known due to a priori knowledge of coding requirements, the determination at block 412 is made simply by identifying the appropriate conversion rate $N_A$, and using logic to determine which path to take in the method 400 (e.g., whether to proceed to block 414 or to block 422) based on the value of $N_A$. For example, in one embodiment and scenario where a converter implementing the method 400 knows a priori that $Y_1=1$ and $M=4$, flow proceeds to block 422 if $N_A=100$ or 1000, and flow proceeds to block 414 if $N_A=10$.

Referring now to FIG. 6B, if it is determined at block 412 that $Y_1*N_A$ has a non-zero remainder when divided by M, flow proceeds to block 414. At block 414, a number of idle symbols is generated. In an embodiment, the number of idle symbols to be generated is determined to be a number that causes the coding requirement to be satisfied (i.e., that causes information symbols be arranged in units of symbol length M in the converted data stream). Moreover, in some embodiments, the number of idle symbols to be generated is determined such that one or more additional coding requirements are also satisfied. For example, in various embodiments, the number of idle symbols is selected to prevent an inserted ordered set from immediately following the converted data packet (i.e., the number of idle symbols is greater than zero symbols), and/or is selected to prevent one or more particular arrangements of idle symbols between the converted data packet and the inserted ordered set (e.g., to prevent any arrangement(s) that a PCS is not able to encode).

At block 416, a number of repetitions of the ordered set (identified at block 406) is generated. The generated number of repetitions includes either more than or fewer than $Y_1*N_A$ control symbols. In some embodiments and scenarios, only a single repetition of the ordered set is generated at block 416. In an embodiment, the number of repetitions that are generated at block 416 is determined based on the number of idle symbols generated at block 414, and/or based on a determined counter value. For example, in one embodiment, a number of repetitions is selected that will cause the counter value to move closest to zero. In another example embodiment, the number of repetitions is determined to be a number that causes the total number of idle symbols (generated at block 414) and control symbols (generated at block 416) to be fewer than $Y_1*N_A$ symbols if the counter value is positive, and more than $Y_1*N_A$ symbols if the counter value is negative. In yet another example embodiment, the number of repetitions is determined to be a number that causes the total number of idle symbols and control symbols to be $Y_1*N_A$ symbols if the counter value is positive or zero, and more than $Y_r*N_A$ symbols if the counter value is negative. In still another example embodiment, the number of repetitions is determined to be a number that causes the total number of idle symbols and control symbols to be fewer than $Y_1*N_A$ symbols if the counter value is positive, and $Y_1*N_A$ symbols if the counter value is negative or zero.

At block 420, a converted data packet (containing the data symbol repetitions generated at block 410), the idle symbols generated at block 414, and the ordered set repetition(s) generated at block 416 are output at the higher, second rate. In an embodiment, the idle symbols immediately follow the converted data packet, and the one or more ordered set repetitions immediately follow the idle symbols. The converted data packet, idle symbols, and ordered set repetition(s) are output to a PCS such as the PCS 20 of FIG. 1, in an embodiment. In other embodiments, the converted data packet, idle symbols, and ordered set repetition(s) are output to a different portion of a PHY.

If it is instead determined at block 412 that $Y_1*N_A$ has a remainder of zero when divided by M, flow proceeds to block 422, where a number of idle symbols is generated. In an embodiment, block 422 is similar to block 414.

At block 424, a number of repetitions of the ordered set (identified at block 406) is generated. In an embodiment, the number of repetitions to be generated at block 424 is determined such that a combination of all the repetitions of the ordered set, plus all of the idle symbols generated at block 422, contains $Y_1*N_A$ symbols, thereby matching the desired $N_A$ conversion ratio.

At block 426, a converted data packet (containing the data symbol repetitions generated at block 410), the idle symbols generated at block 422, and the ordered set repetition(s) generated at block 424 are output at the higher, second rate. Block 426 is similar to block 420, in an embodiment.

In other embodiments, the method 400 includes additional blocks not seen in FIGS. 6A-6B, and/or omits certain blocks that are included in FIGS. 6A-6B. For example, in one embodiment where the number of repetitions of the ordered set generated at block 416 is determined based on a counter value, the method 400 includes a block, prior to block 416, in which the counter value is determined, and/or a later block in which the counter value is incremented or decremented to reflect the difference between (1) the generated number of idle and control symbols and (2) the $Y_1*N_A$ symbols that would have been generated using straightforward $N_A$-times repetition of the control information received at block 404.

In another alternative embodiment, blocks 414 and 422 are omitted from the method 400, and no idle symbols are output at blocks 420 and 426. In one of these embodiments, the number of repetitions of the ordered set generated at block 416 or block 424 is selected such that the coding requirement (i.e., that symbols be arranged in units of symbol length M) is satisfied. In some of these embodiments, the selected number of repetitions of the ordered set generated at block 416 is further based on a counter value to determine whether a surplus or deficit of control symbols should be inserted relative to the desired $N_A$-times conversion rate.

In yet another embodiment, the method 400 includes a block in which $Y_2$ symbols of control information are received after receiving the $Y_1$ symbols of control information at block 404. In this embodiment, the method 400 also includes a block in which a second ordered set is identified based on the received $Y_2$ symbols of control information, a block in which a number of repetitions of the second ordered set is generated, and a block in which the generated repetitions of the second ordered set are output, at the second rate, after the repetitions of the initial ordered set are output at block 420 or 426. In one such embodiment, the number of repetitions of the second ordered set is selected such that the total number of control symbols therein is either more than or fewer than $Y_2*N_A$ control symbols. In some embodiments, the generated number of repetitions of the second ordered set is based on the number of repetitions generated at block 416 (or 424), and/or based on the number of idle symbols generated at block 414 (or 422).

In some embodiments, the blocks of method 140 occur in a different order than seen in FIGS. 6A-6B. For example, in various embodiments, block 414 and/or block 416 occur before (and/or simultaneously with) block 410, and/or block 422 and/or block 424 occur before (and/or simultaneously with) block 410.

The flow of the method 400 is now briefly described with reference to a more specific example embodiment and scenario, in which the converter 16 of FIG. 1 converts a 1 Gbps GMII data stream to a 10 Gbps XGMII data stream (i.e., $N_A$=10) subject to the XGMII coding requirements (1) that data be arranged in four-byte units (i.e., each "symbol" is equal to one byte, and M=4), (2) that ordered sets cannot immediately follow a data packet in the XGMII data stream, and (3) that the sequences /T/I/I/I /O/D/D/D and /D/D/T/I /O/D/D/D cannot be encoded in the XGMII data stream (e.g., due to PCS coding limitations). Also in this embodiment and scenario, each ordered set contains four bytes (i.e., O=4), and control information received at block 404 contains one byte (i.e., $Y_1$=1). At block 402, in this embodiment and scenario, the converter 16 receives a data packet of the GMII data stream from MAC 12, where the GMII data packet contains one or more data bytes. At block 404, a symbol of control information (e.g., indicating a collision or carrier extension associated with the data packet received at block 402) is received from MAC 12. At block 406, the converter 16 identifies an ordered set /O/D/D/D that corresponds to the control symbol received at block 404. At block 410, the converter 16 generates $N_A$=10 repetitions of each data byte of the GMII data packet. At block 412, the converter 16 determines that the conversion rate $N_A$=10 corresponds to a scenario in which $Y_1*N_A/M$ has a non-zero remainder. In this particular embodiment, therefore, GMII to XGMII conversion causes flow to proceed to block 414, whereas MII to GMII conversion instead causes flow to proceed to block 422.

Continuing with this example embodiment and scenario, at block 414, a number of idle bytes is generated that causes the three coding requirements described above to be satisfied. For example, in various embodiments and scenarios, a number of idle bytes is generated in accordance with the number of idle bytes shown in the example XGMII data stream 320, 330, 340, or 350 (e.g., depending on the placement of the last replicated data packet byte relative to a block boundary 314 in FIG. 5A, 5B, 5C, or 5D). At block 416, a single repetition of the ordered set identified at block 406 is generated, again in accordance with the example XGMII data stream 320, 330, 340, or 350. At block 420, an XGMII data packet including the 10 repetitions of each data byte in the GMII data packet, the generated idle bytes, and the single repetition of the ordered set are output to the PCS 20 at 10 Gbps. As described above with reference to FIGS. 5A-5D, any subsequent ordered sets immediately following the first ordered set are repeated two or three times, in an embodiment, depending on the length or number of repetitions of the previous ordered set.

In some embodiments, not all types of ordered sets are handled according to the techniques described above with reference to FIGS. 4-6. For example, in an embodiment, ordered sets that indicate a mode or rate change (e.g., for autonegotiation) are not replicated. In some embodiments, however, idle symbols are nonetheless inserted into the higher-rate, converted data stream for ordered sets indicating a mode or rate change if the ordered set immediately follows a data packet (e.g., in a manner similar to that described above with reference to the embodiment and scenarios of FIG. 4).

In some embodiments, at least portions of the techniques described above are implemented in hardware or firmware. For example, the converter 16 and/or PCS 20 of FIG. 1 are, in whole or in part, implemented by hardware or firmware, in an embodiment. In some of these embodiments, the blocks, operations, techniques, etc., are implemented in, for example, one or more custom integrated circuits (ICs), application specific integrated circuits (ASICs), programmable logic devices (PLDs), field programmable logic arrays (FPGAs), programmable logic arrays (PLAs), etc.

Embodiments of the present disclosure may be embodied in any type of network device used in a communication system including, for example, devices used in communication systems including or coupled to a wired or wireless LAN or a wired or wireless WAN, Internet, cable and satellite based communication systems (such as Internet, data, video and voice communication systems), wireless telephone systems (including cellular phone systems, voice over internet protocol (VoIP) systems, home-based wireless telephone systems), etc.

While the present invention has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

What is claimed is:

1. A method for inserting one or more ordered sets into a data stream converted from a first rate to a second rate $N_A$ times greater than the first rate, such that the converted data stream conforms to a set of coding requirements, wherein the set of coding requirements includes a first requirement requiring that information symbols be arranged in units of a symbol length M, the method comprising:

receiving, at the first rate, a data packet containing one or more data symbols;

receiving $Y_1$ symbols of control information;

identifying a first ordered set based on the received $Y_1$ symbols of control information, wherein the first ordered set contains O control symbols, and wherein $N_A$ is not an integer multiple of O;

generating $N_A$ repetitions of each data symbol of the data packet;

determining whether $Y_1*N_A$ has a non-zero remainder when divided by M;

at least partially in response to determining that $Y_1*N_A$ has a non-zero remainder when divided by M, generating a first number of repetitions of the first ordered set, wherein the first number of repetitions of the first ordered set contains either more than or fewer than $Y_1*N_A$ control symbols; and outputting, at the second rate, (i) a converted data packet containing the $N_A$ repetitions of each data symbol of the data packet and (ii) the first number of repetitions of the first ordered set.

2. The method of claim 1, wherein the method further comprises:
generating a second number of idle symbols; and
outputting, at the second rate, the generated second number of idle symbols between (i) the converted data packet and (ii) the first number of repetitions of the first ordered set.

3. The method of claim 2, wherein generating the second number of idle symbols includes determining a number of idle symbols that causes the first requirement to be satisfied.

4. The method of claim 3, wherein:
the set of coding requirements further includes a second requirement prohibiting ordered sets from immediately following data packets; and
determining a number of idle symbols that causes the first requirement to be satisfied further includes determining a number of idle symbols that causes the second requirement to be satisfied.

5. The method of claim 4, wherein:
the set of coding requirements further includes a third requirement prohibiting one or more arrangements of idle symbols between data packets and ordered sets; and
determining a number of idle symbols that causes the first requirement and the second requirement to be satisfied further includes determining a number of idle symbols that causes the third requirement to be satisfied.

6. The method of claim 2, wherein generating the first number of repetitions of the first ordered set includes determining the first number based on the second number.

7. The method of claim 6, wherein:
the method further comprises determining a counter value; and
determining the first number is further based on the counter value.

8. The method of claim 7, wherein determining the first number based on the second number and the counter value includes selecting a number that will cause the counter value to move closest to zero.

9. The method of claim 7, wherein the method further comprises updating the counter value to reflect a difference between (i) a total number of symbols in the first number of repetitions of the first ordered set and the second number of idle symbols and (ii) $Y_1*N_A$ symbols.

10. The method of claim 6, wherein the method further comprises:
receiving $Y_2$ symbols of control information after receiving the $Y_1$ symbols of control information;
identifying a second ordered set based on the received $Y_2$ symbols of control information, wherein the second ordered set contains O control symbols;
generating a third number of repetitions of the second ordered set, wherein the third number of repetitions of the second ordered set contains either more than or fewer than $Y_2*N_A$ control symbols; and
outputting, at the second rate, the generated third number of repetitions of the second ordered set after the generated first number of repetitions of the first ordered set.

11. The method of claim 10, wherein generating the third number of repetitions of the second ordered set includes determining the third number based on the first number.

12. The method of claim 11, wherein determining the third number is further based on the second number.

13. The method of claim 1, wherein the received first control information includes at least one of (i) a collision indicator, (ii) a carrier extension indicator, (iii) a carrier extension with collision indicator, and (iv) data rate information.

14. An interface for converting data streams from a first rate to a second rate $N_A$ times greater than the first rate, such that the converted data streams conforms to a set of coding requirements, wherein the set of coding requirements includes a first requirement requiring that information symbols be arranged in units of a symbol length M, the interface comprising:
a converter implemented in hardware or firmware executed by a processor, the converter configured to
receive, at the first rate, a data packet containing one or more data symbols;
receive $Y_1$ symbols of control information;
identify a first ordered set based on the received $Y_1$ symbols of control information, wherein the first ordered set contains O control symbols, and wherein $N_A$ is not an integer multiple of O;
generate $N_A$ repetitions of each data symbol of the data packet;
determine whether $Y_1*N_A$ has a non-zero remainder when divided by M;
at least partially in response to determining that $Y_1*N_A$ has a non-zero remainder when divided by M, generate a first number of repetitions of the first ordered set, wherein the first number of repetitions of the first ordered set contains either more than or fewer than $Y_1*N_A$ control symbols; and
output, at the second rate, (i) a converted data packet containing the $N_A$ repetitions of each data symbol of the data packet and (ii) the first number of repetitions of the first ordered set.

15. The interface of claim 14, wherein the converter is further configured to:
generate a second number of idle symbols; and
output, at the second rate, the generated second number of idle symbols between (i) the converted data packet and (ii) the first number of repetitions of the first ordered set.

16. The interface of claim 15, wherein the converter is configured to generate the second number of idle symbols at least in part by determining a number of idle symbols that causes the first requirement to be satisfied.

17. The interface of claim 16, wherein:
the set of coding requirements further includes one or both of (i) a second requirement prohibiting ordered sets from immediately following data packets, and (ii) a third requirement prohibiting one or more arrangements of idle symbols between data packets and ordered sets; and
determining a number of idle symbols that causes the first requirement to be satisfied further includes determining a number of idle symbols that causes one or both of (i) the second requirement, and (ii) the third requirement, to be satisfied.

18. The interface of claim 15, wherein the converter is configured to generate the first number of repetitions of the first ordered set at least in part by determining the first number based on the second number.

19. The interface of claim 18, wherein:
the interface further comprises a counter;

the converter is further configured to determine a value of the counter; and the converter is configured to determine the first number based on the second number and the value of the counter.

20. The interface of claim 19, wherein:

the converter is configured to determine the first number based on the second number and the value of the counter at least in part by selecting a number that will cause the value of the counter to move closest to zero; and the converter is further configured to update the value of the counter to reflect a difference between (i) a total number of symbols in the first number of repetitions of the first ordered set and the second number of idle symbols and (ii) $Y_1*N_A$ symbols.

21. The interface of claim 19, wherein the converter is further configured to:

receive $Y_2$ symbols of control information after receiving the $Y_1$ symbols of control information;

identify a second ordered set based on the received $Y_2$ symbols of control information, wherein the second ordered set contains O control symbols;

generate a third number of repetitions of the second ordered set, wherein the third number of repetitions of the second ordered set contains either more than or fewer than $Y_2*N_A$ control symbols; and output, at the second rate, the generated third number of repetitions of the second ordered set after the generated first number of repetitions of the first ordered set.

22. The interface of claim 21, wherein the converter is configured to generate the third number of repetitions of the second ordered set at least in part by determining the third number based on the first number.

23. The interface of claim 22, wherein the converter is configured to determine the third number based on the first number and the second number.

24. The interface of claim 14, wherein the received first control information includes at least one of (i) a collision indicator, (ii) a carrier extension indicator, (iii) a carrier extension with collision indicator, and (iv) data rate information.

* * * * *